June 30, 1970   J. HRDINA   3,518,015
INCLINED FLOW CELL INCLUDING A SINK FOR SOLID PARTICLES
Filed May 24, 1966
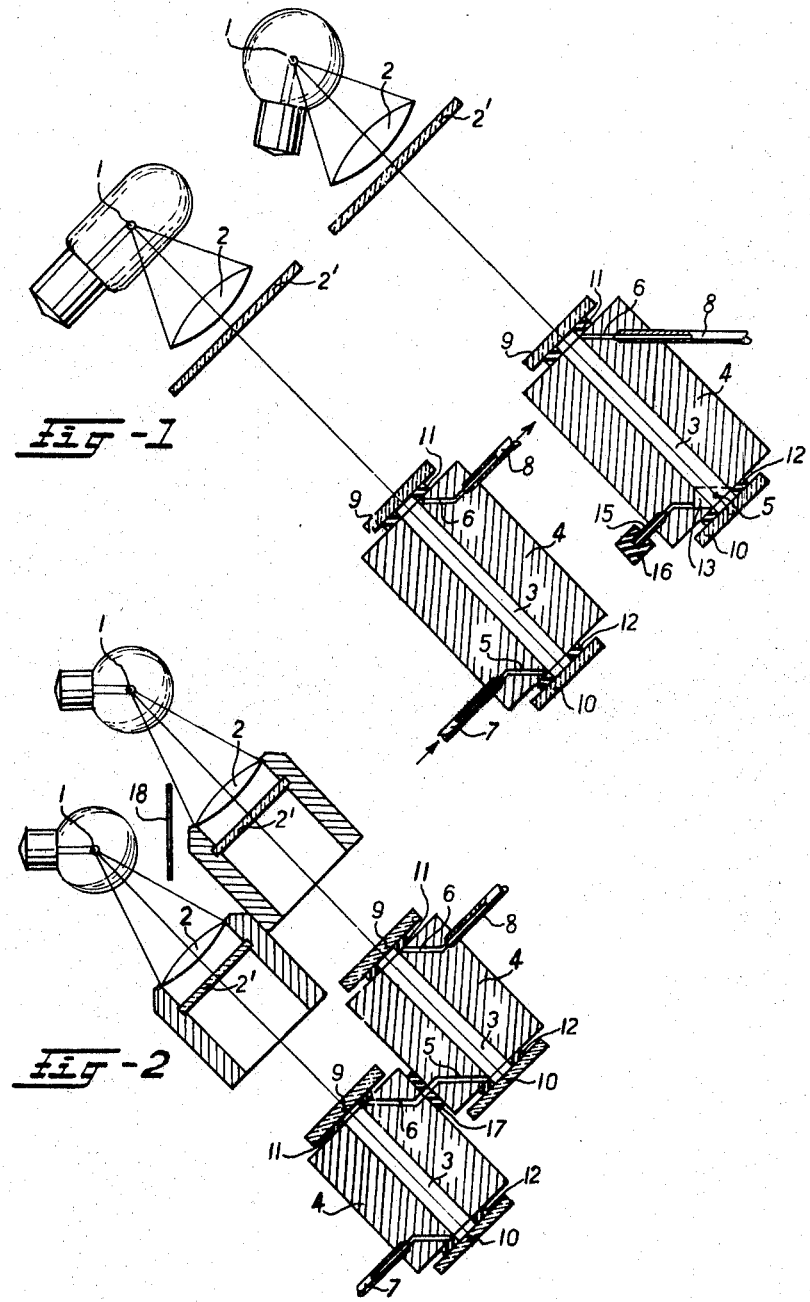
*INVENTOR.*
JIRI HRDINA
BY
Attorney ated June 30, 1970

3,518,015
INCLINED FLOW CELL INCLUDING A SINK
FOR SOLID PARTICLES
Jiří Hrdina, Prague, Czechoslovakia, assignor to Ceskoslovenska akademie ved, Prague, Czechoslovakia
Filed May 24, 1966, Ser. No. 552,517
Claims priority, application Czechoslovakia,
May 28, 1965, 3,484/65
Int. Cl. G01j 3/46; G01n 1/10, 21/26
U.S. Cl. 356—246
2 Claims

ABSTRACT OF THE DISCLOSURE

A photometric flow cell for use in photometers having an inclined passageway for the measuring light rays passing therethrough between its end portions and a sink basin arranged sideways thereof at its lowest portion beyond the action of the light rays to collect heavy particles contained in the fluid to be photometered.

---

This invention relates to through-flow photometers and particularly to photometric measuring cells used therein, through which the measured liquid flows substantially parallel to the direction of the light beam.

With through-flow photometers difficulties are frequently experienced due to the presence of undesirable constituents in the photometered spaces. There are on one hand gas bubbles and other particles lighter than the measured liquid, for instance other immisicble lighter liquids manifesting themselves within the photometered liquid like oil drops and, on the other hand particles heavier than the liquid the former particles tending to rise in the liquid and, the latter sink. Both kinds of particles are usually a source of substantial interferences in the continuous function of a photometer, particularly if they can change their position and happen to be in the part of the luminous flux that impinges after passage through the measuring cell on a light-sensitive member. These particles have a particularly unfavourable effect in photometers with longitudinal measuring cells, i.e. in through-flow measuring cells where the direction of the flow of the liquid in the measuring cell approximately coincides with the axis of the light beam. These measuring cells usually are in known photometers mounted horizontally but may also be mounted in an inclined position. Since the rate of flow of the measured liquid in the space of the measuring cell is as a rule relatively small the lighter particles adhere along its top, whereas the heavier particles are deposited at its bottom. Both kinds of particles can gradually merge into larger ones or into larger groups of these particles which can block the cross section of the measuring cell so that, especially if these particles are partly mobile, they bring about interferences which may render a reliable function of the photometer impossible.

The disadvantages of said arrangement of measuring celsl are eliminated by the arrangement of the photometer according to this invention. Its principle consist in that the whole photometer or at least its through-flow measuring passage is arranged in inclined position the discharge channel for the liquid connected with the interior space of the measuring cell being in its uppermost place and the supply channel opening into this space near the lowermost place and that the interior space of the measuring cell near its lowermost place is provided with a collecting sink for gathering heavy particles so that they may not interfere with the passage of rays through the measuring cell; the lowermost place of this sink can be connected to a closable channel through which the collected impurities can be sucked off, for example by means of a syringe. By using a syringe or a similar device it is possible by means of alternating motions of its piston to clean the entire space of the measuring cell and possibly even the attached channels, and finally even the inner walls of the measuring cell and especially the transparent windows, if a suitable liquid is used which is capable of dissolving or removing the possibly adhering deposits.

As far as the heavier particles are concerned, i.e. fragments, clots, flakes and the like, the inclination of the measuring cell causes them to slide downward to the lowermost place where they are deposited into the above mentioned sink.

Where only heavier particles may occur, the liquid may flow downwards and the discharged channel for the liquid will be connected to the space of the measuring cell nears its lowermost place.

In current cases it is as a rule sufficient if the measuring cell is inclined from the horizontal position at approximately 30°, though the effects described above are fulfilled even for far greater inclinations, for example up to 80°. The required effects are accomplished independently whether the light rays pass through the measuring cell in or against the direction of the flow of the liquid. If in the normal arrangement, with the ascending flow of liquid, the light will impinge on the measuring cell from its lower end, i.e. coincidentally with the flow of the liquid, it is possible to a certain though small extent to reckon also with the favourable effect of the heat absorbed especially in the inlet portions of the liquid contained in the measuring cell which portions after heating have a possibility to rise, and then cause a desirable mixing of the content of the measuring cell.

If on the contrary the light proceeds against the direction of the flow of the liquid in the measuring cell, i.e. in a downwardly inclined direction, there is the advantage that the heat from the light source is conducted to other parts of the photometer. An undesirable heating of substantial parts of the photometer may be the source of inaccuracies, particularly in case the light-senstive members are located relatively close to the source of light, i.e. to the source of undesirable heat.

Particularly advantageous for the function of the photometer is a simultaneous application of diaphragms and similar devices which will secure that the part of the light beam which passes through the measuring cell and impinges on the light-sensitive member does not pass close to the walls of the space of the measuring cell. Thus, in addition to other advantages, the photometric reading will not be affected by moving particles, for example by a bubble which migrates in a straight line along the uppermost surface of the space of the measuring cell to the highest place into the discharge channel.

The drawing shows schematically in FIG. 1 an embodiment of the photometer according to the invention with two inclined measuring cells and FIG. 2 shows an alternative embodiment. In both figures are represented photometers with a couple of independent photometric units according to the invention. Each of them contains a light source 1, for example the filament of an incandescent lamp. The light beam emitted by the source 1 is so adjusted by the optical system 2 that after passage for example through a monochromatic filter 2′ it creates a real image of the source 1, approximately in the centre space 3 of the measuring formed by a bore in the body 4 of the measuring cell. In this body are also the supply channel 5 and the discharge channel 6 which are connected for example by means of hollow needles 7 and 8 to elastic supply and discharge hoses. The space 3 of the measuring cell is closed at the ends by transparent plates 9 and 10 and elastic sealings 11 and 12, which are pressed by an unrepresented device to the body 4 of the measuring cell. The supply channel 5 supplies the liquid to the at least substantially lowest place of the space 3 of the measuring cell and the channel 6 conducts the liquid together with bubbles and the lighter particles through a hollow needle 8 into the discharge hose.

According to FIG. 1 a storage sink 13 designed for collecting particles heavier than the photometered liquid is arranged in the space 3 of the measuring cell of the upper photometer. The heavier particles settle in this storage sink 13 which is the lowest place of the measuring space 3 of the measuring cell and do not interfere with the photometric luminous beam or rays. Linked up with the lowest place of the storage sink 13 may be a channel 14 continuing in a hollow needle 15 which is normally closed with a stopper 16. After removing this stopper 16 and after connecting for example a hose leading to a syringe, it is possible to clean the internal space of the measuring cell and possibly also of the connected channels and to suck off heavier particles collected in the storage sink 13. Although one form of my invention has been shown and described by way of illustration, it will be understood that it may be differently embodied within the scope of the appended claims.

I claim:

1. A photometric flow cell for use in photometers comprising a body having an inclined elongated passageway for the measuring light rays passing therethrough and for the fluid to be measured, said body having transparent walls at opposite ends of said passageway, a supply duct extending through said body and communicating with said passageway adjacent the lower end thereof, said passageway having a larger cross-sectional area than said supply duct, a discharge duct extending through said body and communicating with said passageway at the upper end thereof, said body including a storage sink open to said passageway at substantially the lowest level of said passageway, said sink and said outlet duct being on diametrically opposite sides of said pasageway and said supply duct being spaced circumferentially from said sink, whereby heavy particles entering said passageway from said supply duct collect in said sink while gas bubbles pass upwardly along the upper side of said passageway and pass out of said body through said discharge duct, thereby avoiding interference with photometric analysis.

2. A photometric apparatus according to claim 1 wherein said body includes a separate duct extending through said body and communicating with said sink, whereby particles collected in said sink may periodically be removed.

References Cited

UNITED STATES PATENTS 2,642,536  6/1953  Heigl.
3,345,910  10/1967  Rosin et al.

RONALD L. WIBERT, Primary Examiner

O. B. CHEW II, Assistant Examiner

U.S. Cl. X.R.

250—218